United States Patent
Fan

(10) Patent No.: US 6,254,012 B1
(45) Date of Patent: *Jul. 3, 2001

(54) SEEPING IRRIGATION SYSTEM

(76) Inventor: Jianhua Fan, 5800 Maudina Ave. Apt. C-2, Nashville, TN (US) 37209

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,958

(22) Filed: Feb. 10, 1999

(51) Int. Cl.[7] ............................. A01G 27/00; B05B 15/00
(52) U.S. Cl. ............................. 239/145; 239/542
(58) Field of Search ........................... 239/145, 542

(56) References Cited

U.S. PATENT DOCUMENTS

| | | | | |
|---|---|---|---|---|
| 1,368,123 | * | 2/1921 | Donaldson | 239/145 |
| 1,484,575 | * | 2/1924 | Shulin | 239/542 |
| 2,769,668 | * | 11/1956 | Richards | 239/145 |
| 2,798,768 | * | 7/1957 | Babin | 239/145 |
| 3,521,821 | * | 7/1970 | Emsbach | 239/145 |
| 3,799,442 | * | 3/1974 | Delmer | 239/145 |
| 5,368,235 | * | 11/1994 | Drozdoff et al. | 239/542 |
| 5,709,049 | * | 1/1998 | Baird | 47/27 |

FOREIGN PATENT DOCUMENTS

| | | | | |
|---|---|---|---|---|
| 2004141 C1 | * | 12/1993 | (RU) | 239/145 |
| 1625-439 | * | 2/1991 | (SU) | 239/145 |
| 1667739 A1 | * | 8/1991 | (SU) | 239/145 |

* cited by examiner

Primary Examiner—David A. Scherbel
Assistant Examiner—Davis Hwa

(57) ABSTRACT

A seeping irrigation system has one or more tubes or conduits, and one or more strings or threads. Each string or thread connects the tube(s) or conduit(s) by passing through the wall of tubes or conduits. At inside of tubes or conduits, the inside parts of strings or threads touch with fluid, then the fluid is seeped out through strings or threads. The parts of strings or threads at outside touch a plant material such as soil etc., so that the seeped out fluid goes into the plant material such as soil for plants use. One end of tubes or conduits has been stopped, and the second end of the tubes or conduits connects to the source of fluid.

6 Claims, 2 Drawing Sheets

SEEPING IRRIGATION SYSTEM

BACKGROUND OF THE INVENTION

I. Field of the Present Invention

The present invention relates to a tube or conduit with strings or threads which is applicable to irrigation.

II. Description of the Prior Art

Traditional irrigation systems for plants, flower, and vegetables etc. are the tube drip irrigation system (FIGS. 1 and 2). The main problems of the traditional tube drip irrigation system are that they are not designed to solve water and fertilizer loss problems, also producers have to take care of them more frequently because the tubes are easy to drip out from pots. Seeping irrigation for garden is seeping irrigation hosepipe, (FIG. 3). The main problem of the traditional seeping irrigation hosepipe in using is that its limitation because this system can not be used to irrigate the potting plants.

There is a need for a new seeping irrigation system to solve the above problems. The present invention provides a solution to solve the above and other relating problems.

SUMMARY OF THE NEW SEEPING IRRIGATION SYSTEM

The present invention relates to tube(s) or conduit(s) with string(s) or thread(s) that can seep fluid out from tube(s) or conduit(s). The present invention can be used in a variety of irrigation (systems) to solve the above described problems.

In one embodiment of the present invention, a seeping irrigation system includes tube(s) or conduit(s), and at least one string or thread connecting to the tube or conduit. Further in one embodiment, one end of a tube or conduit has been stopped. Furthermore, in one embodiment, a second end of the tube or conduit connects to source of fluid, such as plastic distribution tubes, plastic bags, bottles etc.

Advantages of the above invention are:

1. No water loss.
2. No fertilizer, pesticide, chemical leak into ground.
3. The tube(s) or conduit(s) will not drip out from pots.
4. The new seeping irrigation system can be used in somewhere that there are no tap water.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

A better understanding of the construction and operational characteristics of a preferred embodiment(s) can be realized from a reading of the following detailed description, especially in light of the accompanying drawing in which like reference numerals in the several views generally refer to corresponding parts.

DETAILED DESCRIPTION OF THE PREFERRED EMBODIMENT

The present invention relates to tube(s) or conduit(s) with string(s) or thread(s), more particularly to a tube or conduit with at least one string or thread, and furthermore particularly to tube(s) or conduit(s) with one, two, or more strings or threads.

In the following description of the exemplary embodiment, reference is made to the accompanying drawings which form a part hereof, and in which is shown by way of illustration the specific embodiments in which the invention may be practiced. It is to be understood that other embodiment may be utilized as structural changes may be made without departing from the scope of the present invention.

Figure 2:
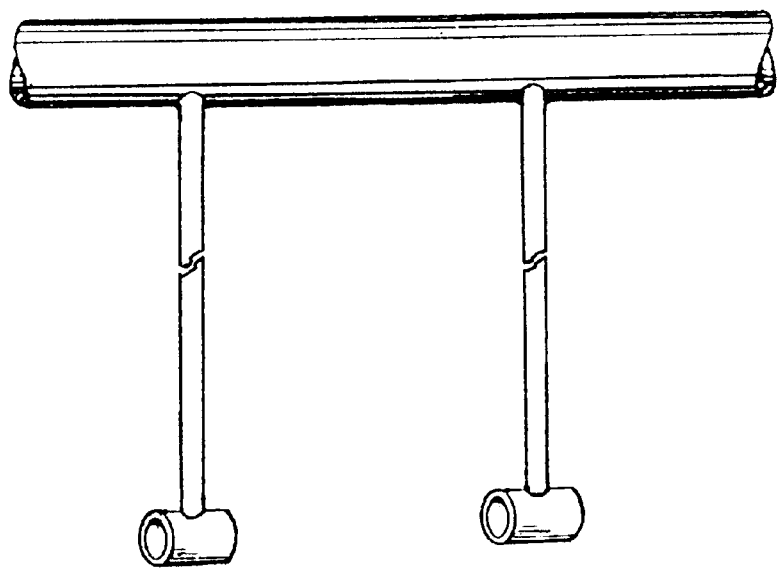
FIG. 2. is an another perspective view of a traditional tube drip irrigation system.
Figure 3:
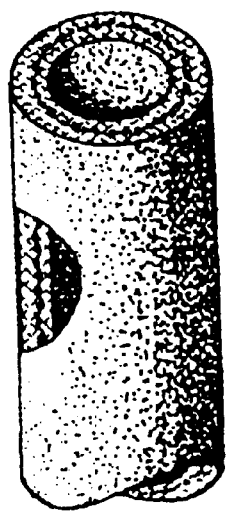
FIG. 3. is a perspective view of seeping irrigation hosepipe.
Figure 1:
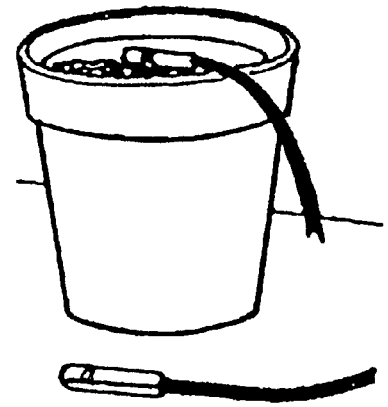
FIG. 1. is a perspective view of a traditional tube drip irrigation system.
Figure 5:
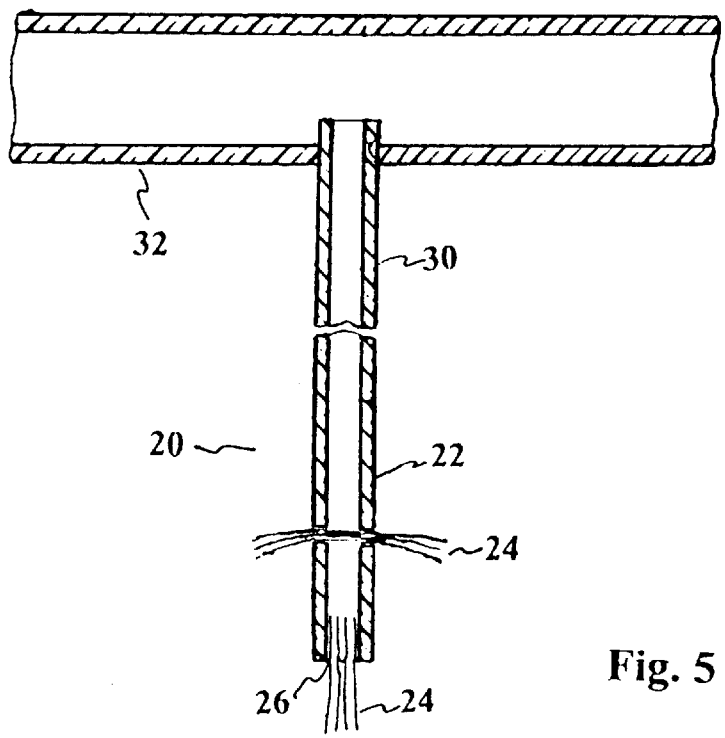
FIG. 5. is an exploded side view of a new seeping irrigation system in accordance with the present invention.
Figure 4:
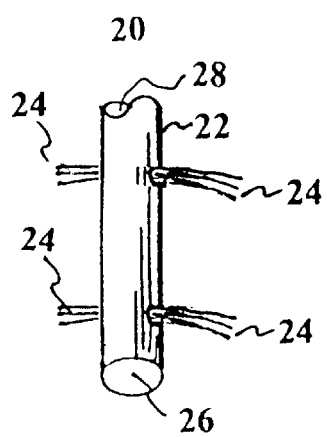
FIG. 4. is a perspective view of new seeping irrigation system in accordance with the present invention.

Referring now to FIG. 4, there is, generally illustrated by reference numeral 20, a new seeping irrigation system in accordance with the principles of the present invention. The new seeping irrigation system 20 has a tube or conduit 22, string(s) or thread(s) 24. At first end 26 of tube or conduit 22 has been stopped, so that fluid can not come out from that end 26 of the tube or conduit 22, A second end 28 of the tube or conduit is connected onto a source of fluid (shown in FIG. 5) such as water distribution plastic pipe, plastic bag, bottle etc., It is appreciated that other type of source of fluid connection can be used within the principles of the invention.

A string or thread 24, at least one string or thread, further particularly to a tube or conduit 22 with one, two, or more strings or threads 24 pass the wall of the tube or conduit 22 from out side of the tube or conduit into inside of the tube or conduit. Furthermore, a string or thread passes one side wall of the tube or conduit into the tube or conduit and through the inside of the tube or conduit, then passes another side of the tube or conduit from inside to outside of the tube or conduit 22.

Figure 6:
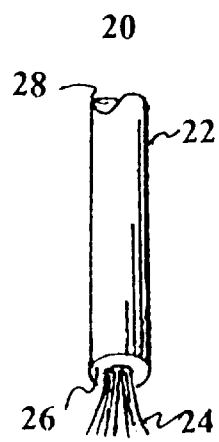
FIGS. 6 and 7 are the perspective views of others connecting between tube(s) or conduit(s) and string(s) or thread(s).

FIG. 6 shows another way of connection between tube or conduit 22 and string(s) or thread(s) 24. The string(s) or thread(s) pass through the stop of end 26 into the inside of the tube or conduit 22.

The inside end(s) or part(s) of string(s) or thread(s) 24 contact fluid (not shown), then fluid is seeped out from the tube or conduit through the string(s) or conduit(s) 24, and into the plant material such as soil for plant uses while the tube or conduit inserts (sticks) into the plant material.

Figure 7:
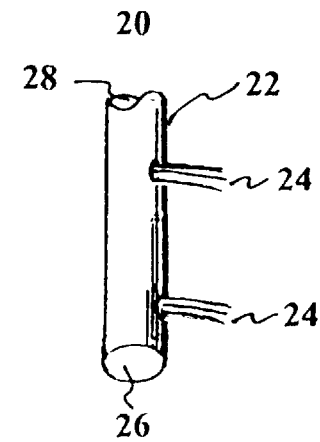

FIG. 7 shows the another connection between the tube or conduit 22 and the string(s) or conduit(s). The string(s) or conduit(s) 24 pass the wall of the tube or conduit 22 from outside of the tube or conduit into inside of the tube or conduit, but do not pass another side of wall. This way of connection is the same as the end stop connection (FIG. 6). The different is only the location.

In use, the first end(s) or part(s) of string(s) or thread(s) at inside of the tube or conduit touch with fluid at inside of the tube or conduit, and the second end(s) or part(s) of string(s) or thread(s) at outside of the tube(s) or conduit(s) touch with a plant material such as soil.

The foregoing description of the exemplary embodiment of the invention has been presented for the purposes of illustration and description. It is not intended to be exhaustive or to limit the invention to the precise form disclosed. many modifications and variations are possible in light of the above teaching. It is intended that the scope of the invention be limited not with detailed description, but rather by the claims appended hereto.

What is claimed is:

1. A seeping irrigation system for irrigation fluid, comprising:

a feeder tubing with fluid source; and at least one (a) longitudinal conduit having a first end and a second end, the first end extends into feeder tubing, and the second end extends beyond the exterior of feeder tubing, and the second end is stopped (end) such that the fluid is stopped from flowing out at the stopped end, and at least one (a) fluid seeping port; and at least one string having a first end and a second end, the first end of the string extending outside of the conduit from the fluid seeping port, and the second end being disposed inside of the conduit at the fluid seeping port, wherein the fluid seeps out of the conduit from the second end to the first end of the at least one string via the fluid seeping port.

2. The seeping irrigation system of claim 1, wherein the fluid seeping port is disposed at a side wall of the conduit.

3. The seeping irrigation system of claim 1, wherein the fluid seeping port is disposed at the stopped end of the conduit.

4. The seeping irrigation system of claim 1, wherein the string extending outside from the fluid seeping port is substantially vertical to the longitudinal conduit.

5. A seeping irrigation system for irrigation fluid, comprising:

a feeder tubing with fluid source; and at least one (a) longitudinal conduit having a first end and a second end, the first end extends into feeder tubing, and the second end extends beyond the exterior of feeder tubing, and the second end is stopped (end) such that the fluid is stopped from flowing out at the stopped end, and a first fluid seeping port, a second fluid seeping port; and at least one string having a first end, a second end, and a middle section, the first end of the string extending outside of the conduit from the first fluid seeping port, the second end extending outside of the conduit from the second fluid seeping port, the middle section being disposed inside of the conduit extending between the first fluid seeping port and the second fluid seeping port, the string extending outside from the first and second fluid seeping ports is substantially vertical to the longitudinal conduit, wherein the fluid seeps out of the conduit from middle section to the first and second end of the strings via the fluid seeping ports.

6. The seeping irrigation system of claim 5, wherein the first and second fluid seeping ports being disposed on opposite sides walls of the longitudinal conduit.

* * * * *